United States Patent
Reutenauer et al.

(10) Patent No.: US 7,513,461 B2
(45) Date of Patent: Apr. 7, 2009

(54) ARTICULATED ASSEMBLY OF SOLAR GENERATOR PANELS AND SPACE VEHICLE

(75) Inventors: Xavier Reutenauer, Mandelieu-la-Napoule (FR); Philippe Samson, Nice (FR)

(73) Assignee: Thales, Neuilly sur Seine (FR)

( * ) Notice: Subject to any disclaimer, the term of this patent is extended or adjusted under 35 U.S.C. 154(b) by 446 days.

(21) Appl. No.: 10/533,075

(22) PCT Filed: Oct. 17, 2003

(86) PCT No.: PCT/FR03/03065

§ 371 (c)(1),
(2), (4) Date: Jul. 26, 2005

(87) PCT Pub. No.: WO2004/039673

PCT Pub. Date: May 13, 2004

(65) Prior Publication Data

US 2006/0049317 A1    Mar. 9, 2006

(30) Foreign Application Priority Data

Oct. 29, 2002  (FR)  .................................. 02 13499
Aug. 1, 2003   (FR)  .................................. 03 09510

(51) Int. Cl.
    *B64G 1/40*    (2006.01)
(52) U.S. Cl. .................. 244/172.6; 244/172.7; 136/245
(58) Field of Classification Search .............. 244/172.6, 244/172.7, 172.8; 136/245; 323/906
    See application file for complete search history.

(56) References Cited

U.S. PATENT DOCUMENTS

| 3,386,128 | A  |   | 6/1968  | Vyvyan           |         |
|-----------|----|---|---------|------------------|---------|
| 5,133,518 | A  | * | 7/1992  | Flament          | 244/168 |
| 6,175,989 | B1 |   | 1/2001  | Gehling          |         |
| 6,343,442 | B1 |   | 2/2002  | Marks            |         |
| 6,543,725 | B1 | * | 4/2003  | Meurer et al.    | 244/172.6 |
| 2001/0037538 | A1 | * | 11/2001 | Duperray et al. | 16/225  |

FOREIGN PATENT DOCUMENTS

| DE | 88 02 500 U  | 5/1988  |
| EP | 0 360 694 A  | 3/1990  |
| EP | 0 754 625 A  | 1/1997  |
| EP | 1 043 228 A  | 10/2000 |
| FR | 2 635 077 A  | 2/1990  |
| FR | 2 756 028 A  | 5/1998  |

* cited by examiner

*Primary Examiner*—J. Woodrow Eldred
(74) *Attorney, Agent, or Firm*—Sughrue Mion, PLLC

(57) ABSTRACT

The invention relates to an articulated assembly (1) comprising at least two panels (4-7) which are positioned close to a solar generator. The aforementioned panels are articulated in pairs such they can pivot between a stacked configuration, in which the panels are stacked on top of one another, and an unstacked or deployed position, in which the panels are disposed essentially in one plane, said panels being interconnected by means of a hinge. According to the invention, the hinge element is formed by at least one Carpentier coupling (11) which performs the following two functions: (i) in the stacked configuration and during deployment, the coupling generates a permanent driving torque which moves the panels into the unstacked configuration; and (ii), in the unstacked configuration, the coupling provides a mechanical restraint for the panels.

6 Claims, 1 Drawing Sheet

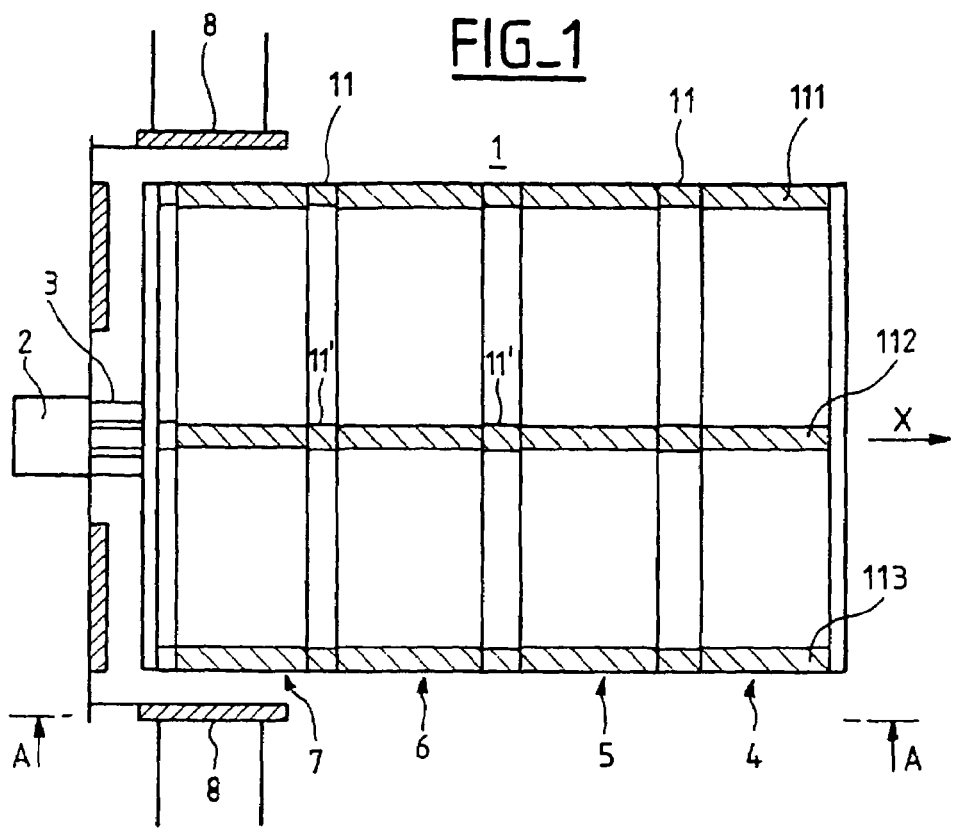
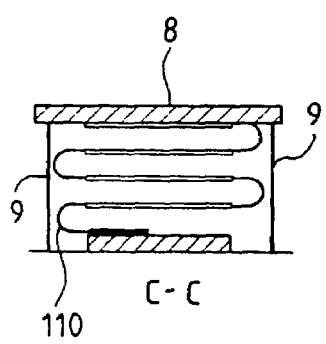
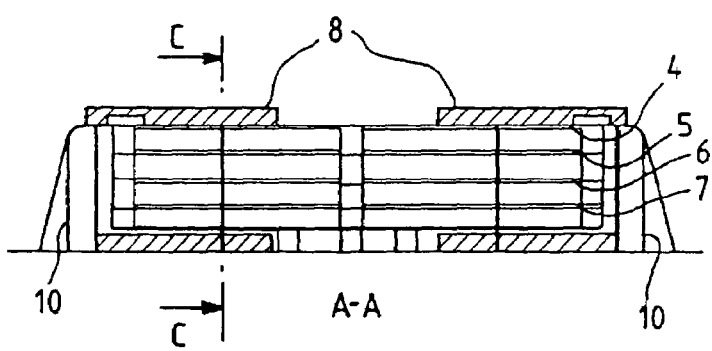

ARTICULATED ASSEMBLY OF SOLAR GENERATOR PANELS AND SPACE VEHICLE

The present invention relates generally to the deployment of solar generator panels of a space vehicle, such as a satellite in orbit around the Earth, although this is not limiting on the invention.

In the present context, the expression "solar generator panel" means all the plane structures of the solar generator having active optical, thermal or photovoltaic surfaces, and in particular:

support panels of an array of identical or different photovoltaic cells for converting solar energy into electrical energy;
  reflector panels that concentrate solar radiation onto the above panels thanks to a coating with appropriate properties;
  panels used for their surface thermo-optical characteristics (heat dissipation).

The panels of a solar generator may be arranged in highly diverse configurations. Conventionally there is a longitudinal succession parallel to a direction away from the body of the space vehicle and about which the generator is adapted to turn to track the sun. However, to increase the available electrical power, it has been proposed to provide lateral panels in addition to the panels previously referred to. Also known in the art are configurations in which the panels are disposed in a transverse direction, i.e. in a direction transverse to the aforementioned longitudinal direction in which extends the yoke or spacer arm that connects the generator to the body of the space vehicle and about which the generator is adapted to turn to track the Sun.

During launch, the generator is folded and its panels are stacked one on the other in a configuration known as the stacked or stacking configuration.

Putting the generator into operational service, for example when the vehicle is a satellite that has been placed in its service orbit, entails unfolding the stack of panels: this is referred to as unstacking.

To go from the stacking configuration to the deployed configuration in which the solar panels are disposed in substantially the same plane, the panels are hinged in pairs, either by means of joints having adjacent elements hinged about a pivot axis and each fastened to one of two adjacent panels, or by means of joints connecting parallel edges of the panels.

The first joints cited above are generally used to connect the panels of the longitudinal succession cited above (in-line panels), whereas the second joints cited above are generally used to connect the lateral panels to the in-line panels.

Generally speaking, the joints currently used for solar panels are characterized by the existence of friction between the parts in contact. Such joints necessitate lubrication, which is very difficult to provide given the extreme conditions of temperature and vacuum to which the satellite is subjected during launch and after it is placed in orbit. Under these conditions, materials tend to weld together spontaneously or to bind, with the risk of non-deployment of the panels.

Furthermore, the current joints generally deploy the panels by means of a specific drive system. The high and dispersed friction in the joints necessitates a powerful drive system.

Moreover, to lock the in-line panels in the deployed configuration, the panel joints are generally provided with a locking mechanism including rotary locking means mounted on a first of two adjacent elements and cooperating with the second of the two adjacent elements to lock the corresponding two panels in their deployed configuration. The locking means are constrained to rotate with a lug rotatably mounted on the first of the adjacent elements and temporarily locked against rotation by being abutted against a peripheral surface of an element constrained to rotate with the second of the two adjacent elements. The peripheral surface has a configuration such that when the corresponding two panels reach the deployed configuration the lug escapes from the peripheral surface and pivots to bring the locking means into contact with the second of the two adjacent elements in order to lock the two panels in the deployed configuration.

Such joints represent a mass penalty for the satellite.

An objective of the invention is therefore to provide a hinged set of solar generator panels whose mass does not penalize the mission by minimizing the number of mechanical elements without compromising the storage and deployment functions or the mechanical strength of the panels in the unstacked configuration.

To this end, the invention consists in a hinged assembly formed of at least two adjacent panels of a solar generator hinged in pairs to pivot from a stacking configuration, in which the panels are stacked one on the other, to an unstacking or deployed configuration, in which the panels are disposed substantially in the same plane, the two panels being connected together by at least one hinge, characterized in that said hinge is formed of at least one Carpentier leaf spring joint having the dual function of:
  in the stacking configuration and in the deployment phase, generating a continuous driving torque tending to move the panels toward the unstacking configuration, and
  in the unstacking configuration, mechanically retaining the panels in that configuration.

Thus the hinged assembly of panels according to the invention has a mechanical panel hinge structure that is optimized in terms of its mass.

It is therefore possible to deploy in-line and/or lateral panels under kinematic conditions such that a panel is opened spontaneously, without additional drive means, thanks to a simple and light mechanical device having the advantages referred to above, namely a Carpentier joint.

It is important to note that a system of the above kind could if necessary be transposed to the deployment of in-line or lateral panels with respect to each other, for example.

According to one embodiment of the invention, said hinges between two adjacent panels are formed only of Carpentier joints.

According to one embodiment of the invention, said Carpentier joints extend under the panels that they connect.

According to one embodiment of the invention, the plurality of Carpentier joints forming the connection between two adjacent panels is adapted to feature a crossed succession of Carpentier joints adapted to generate opposite driving torques as a result of folding the two adjacent panels.

According to one embodiment of the invention, the routing of the power current between panels is effected by a wiring harness using a material having the same mechanical properties as a Carpentier leaf spring.

The deployment of the panels is usually sequenced electrically, using pyrotechnic devices, such as pyrotechnic shears, to release pallets retaining the panels in the stacking configuration. To this end, at the appropriate time, the pyrotechnic devices break tie-rods retaining the retaining pallets, which releases the panels to move from the stacking configuration to the unstacking configuration.

According to one embodiment of the invention, the vehicle includes pallets for retaining the panels in the stacking configuration and, when the panels are in the stacked configuration, said pallets lie in planes parallel to those of the panels, each pallet being connected to a fixed structure of the vehicle by at least one Carpentier joint adapted to exert a driving torque tending to move the pallet out of the panel deployment space.

According to one embodiment of the invention, the geometry and the area of the pallets are chosen so that, when in the stacked configuration, the pallets cover only part of the surface of the upper panel.

The invention also consists in a space vehicle, in particular a satellite, characterized in that it includes a hinged assembly according to the invention.

The present invention is described in more detail next with reference to the appended drawings, in which:

FIG. 1 represents a satellite wing including a hinged set of solar panels in an unstacked configuration conforming to one embodiment of the invention, FIG. 2 represents the satellite wing in the stacked configuration in section taken along the line A-A in FIG. 1, and FIG. 3 represents the satellite wing in section taken along the line C-C in FIG. 2.

In the present application, elements having similar functions carry identical reference numbers.

FIGS. 1 to 3 show diagrammatically a small part of a hinged assembly 1 formed of four panels forming part of a solar generator.

For clarity, the remaining panels of the solar generator and the remainder of the satellite itself are not shown in the figures.

The hinge assembly 1 is connected to a mechanism 2 for rotating the assembly by means of a yoke 3.

The assembly 1 includes four rigid deployable panels numbered 4 to 7 in the figures.

The panels are hinged in pairs in order to be able to pivot from a stacking configuration represented in FIGS. 2 and 3, in which the panels are stacked one on the other, to a deployed configuration represented in FIG. 1, in which the panels are disposed in substantially the same plane.

In the embodiment described with reference to FIGS. 1 to 3, the panels 4 to 7 are adapted to form a longitudinal succession of in-line panels. They are hinged together in pairs by means of Carpentier joints 11, each of which is fastened on each side to one of two parallel edges of adjacent panels. As explained hereinafter, these Carpentier joints 11 have a "self-driving" effect that deploys the panels that they connect, and there are three of them for each pair of parallel edges.

Of course, this number of joints is in no way limiting on the invention.

The person skilled in the art uses the term "Carpentier joint" to refer to the principle of mechanical driving and locking associated with a leaf spring. Accordingly, the use hereinafter of the term "Carpentier joint" refers to the use of a leaf spring alone, without any additional mechanical means, with the possible exception of means for fixing the leaf springs to the panels or to thin film cells.

It must be clearly understood that the leaf springs are the only elements joining two panels. It is in this respect that the invention is beneficial, self-driving and locking functions being provided by the same compact element.

In FIGS. 2 and 3, the panels stacked one on the other are retained in the stacked configuration by pallets 8 that are themselves held in this position by tie-rods 9 fixed to a fixed structure of the satellite (not shown). In this latter position, the Carpentier joints form an elbow profile 110 at each bend, compressed by the retaining pressure of the pallets. The Carpentier joints 10 therefore work in flexion and a traction force is applied to the pallets.

To trigger the deployment of the panels, the tie-rods are broken by pyrotechnic shears (not shown). As a result, because of the Carpentier joints 10 connecting the pallets to the structure, the pallets are driven in rotation through 90°, moving the pallets out of the field of deployment of the panels.

At this moment, when the retaining pallets are released, the driving torque stored in the Carpentier joints 11 automatically deploys the panels, as shown in FIG. 1. Once in the unstacked configuration, the Carpentier joints are perfectly straight and lock the panels in this position.

According to one embodiment of the invention, the plurality of Carpentier joints forming the connection between two adjacent panels features a crossed succession of Carpentier joints 11 and 11' so that opposite driving torques are developed upon folding two adjacent panels.

Note that the geometry and the area of the pallets is chosen so that they cover only part of the surface of the upper panel 4. This significantly reduces the inertia of the wing.

The panels include solar cells, preferably cells employing the technology known to the person skilled in the art as the "thin film" technology. According to one advantageous aspect of the invention, the panels include thin film cells and there is no interleaved protective film between the facing panels in the stacked configuration.

According to a highly advantageous variant of the invention shown cross-hatched in FIG. 1, three Carpentier leaf springs 111-113 pass through the wing along the main deployment axis of the wing, merging at the joints 11, 11'. This achieves the advantage referred to hereinabove of providing the Carpentier joint function at the hinges 11, 11' and the additional function of supporting the "thin film" flexible substrate.

According to another advantageous embodiment of the invention, current is routed between the panels by a wiring harness using a copper alloy of the CuBe type having the same mechanical properties as a Carpentier leaf spring.

The invention claimed is:

1. Hinged assembly (1) formed of at least two adjacent panels (4-7) of a solar generator hinged in pairs to pivot from a stacking configuration, in which the panels are stacked one on the other, to an unstacking or deployed configuration, in which the panels are disposed substantially in the same plane, the two panels being connected together by at least one hinge,
  characterized in that said hinge is formed exclusively of a Carpentier leaf spring joint (11) having the dual function of:
    in the stacking configuration and in the deployment phase, generating a continuous driving torque tending to move the panels toward the unstacking configuration, and
    in the unstacking configuration, mechanically retaining the panels in that configuration,
  and in that said Carpentier leaf spring joint extends under the panels that it connects to form the support structure thereof.

2. Assembly according to claim 1, characterized in that the plurality of Carpentier leaf spring joints forming the connection between two adjacent panels provides a crossed succession of Carpentier leaf spring joints (11, 11') to generate opposite driving torques upon folding the two adjacent panels.

3. Assembly according to claim 1, characterized in that power current is routed between panels by a wiring harness using a material having the same mechanical properties as said Carpentier leaf spring joint.

4. Assembly according to claim 1, characterized in that the vehicle includes pallets (8) for retaining the panels in the stacking configuration and in that, in the stacked configuration, said pallets lie in planes parallel to those of the panels, each pallet being connected to a fixed structure of the vehicle by at least one second Carpentier leaf spring joint (10) adapted to exert a drive torque tending to move the pallets out of the panel deployment space.

5. Assembly according to claim 4, characterized in that the geometry and the area of the pallets is chosen so that, when in the stacked configuration, the pallets cover only part of the surface of the upper panel.

6. A satellite characterized in that it includes a hinged assembly according to claim 1.

* * * * *